July 31, 1951  C. HARRIS  2,562,189
TRAILER FOR BURIAL VAULT HANDLING
Filed March 5, 1949  3 Sheets-Sheet 3
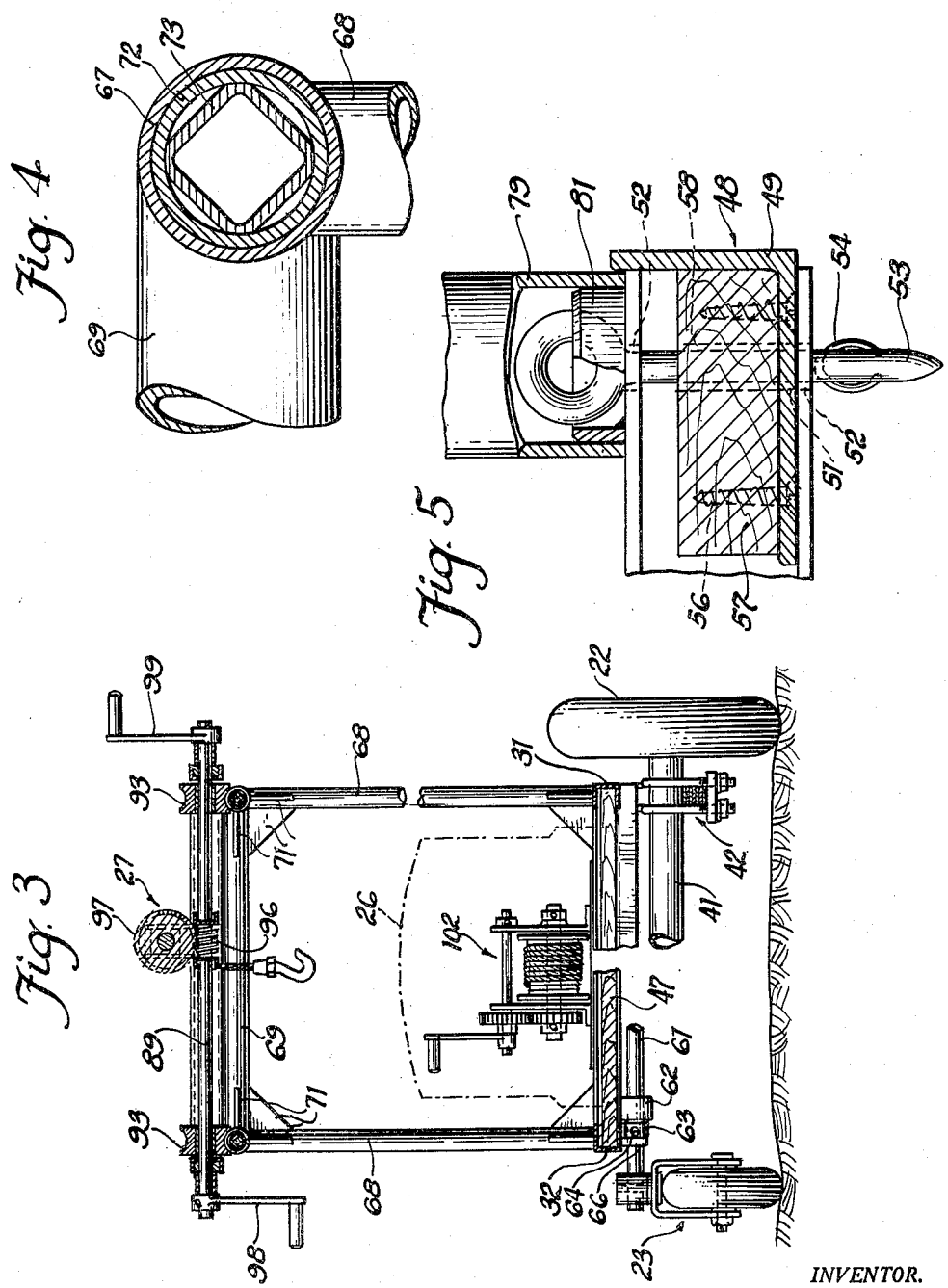
INVENTOR.
Carl Harris
BY Murray A. Gleeson
Attorney

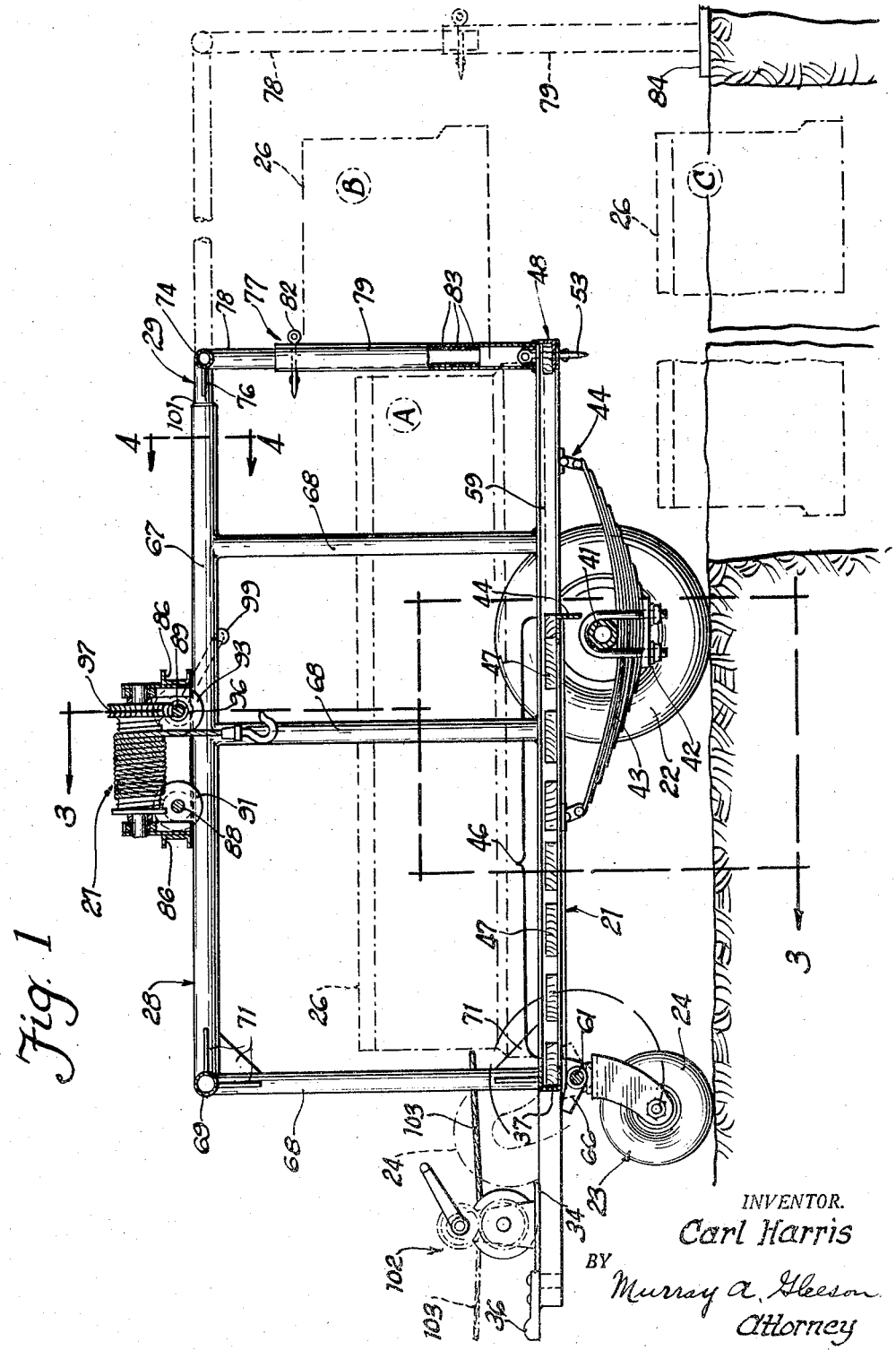

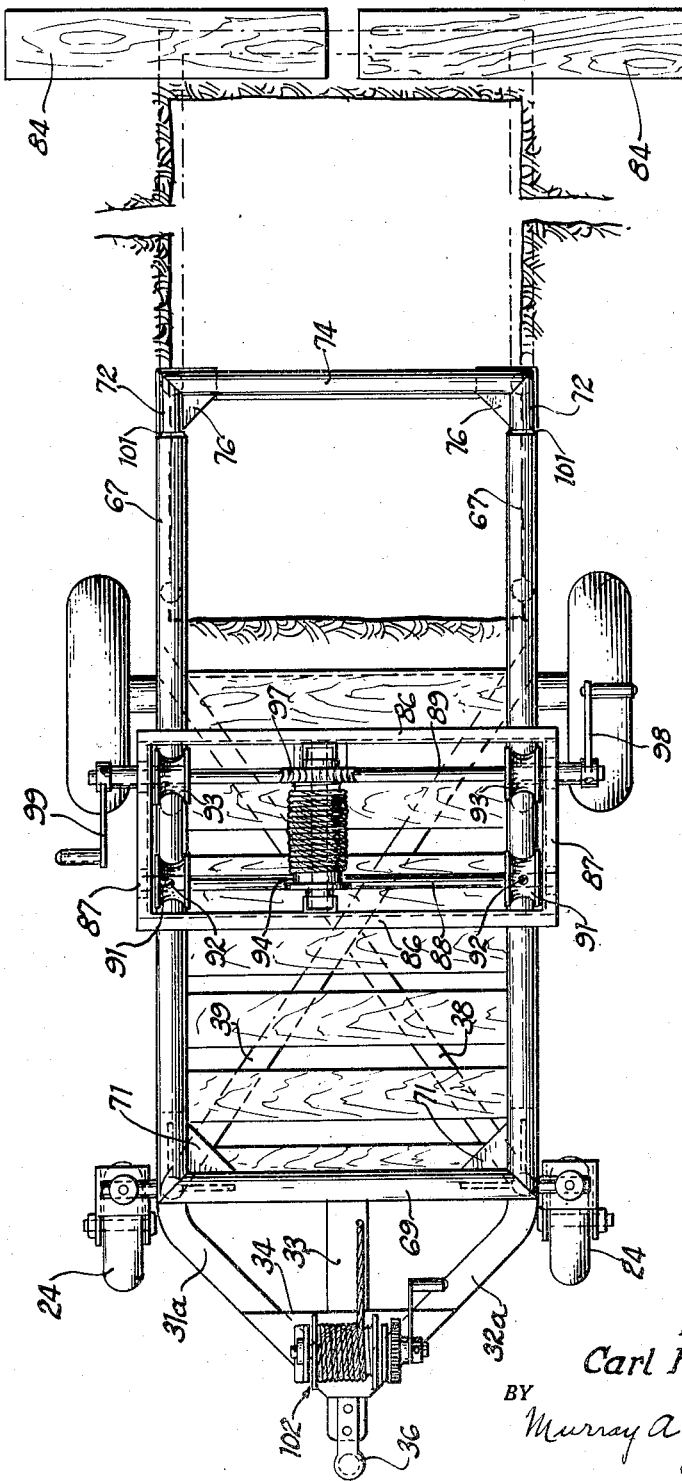

Patented July 31, 1951

2,562,189

UNITED STATES PATENT OFFICE 2,562,189

TRAILER FOR BURIAL VAULT HANDLING

Carl Harris, Aurora, Ind.

Application March 5, 1949, Serial No. 79,823

7 Claims. (Cl. 214—75)

This invention relates to an improved trailer-placer for carrying a heavy object, such as a concrete burial vault, to a grave excavation and lowering it in place therein with a minimum of manual labor.

Many different trailer type burial vault handling devices have been constructed, but as far as I have been able to determine they all have the disadvantage that when in position to lower the vault into the grave, the wheels straddle the center of the long sides of the grave thereby applying the combined weights of both the trailer and the vault to the earth at the weakest points about the grave. This is a serious problem in many types of terrain where the earth is normally soft or sandy, and particularly so in most types of terrain in the spring and fall when the earth is likely to be damp, and even muddy. To minimize the danger of the earth giving way beneath the loaded trailer and dropping both the trailer and vault into the grave, it has been customary to lay planks alongside the grave to support the trailer wheels in the manner illustrated in Patent 2,444,690 issued July 6, 1948. In my opinion that is not a satisfactory solution to the problem, because to be effective the planks must be very thick, therefore very heavy, and since every site cannot be depended on to have such planks available, the planks must be transported with the trailer.

Accordingly, a primary object of the present invention is to provide a trailer-placer for a burial vault, or the like, which, when in position to lower the vault into the grave, applies the load to the strongest earth areas forward and rearward of the excavation instead of stradding the grave across the weak points in the above mentioned conventional manner. However, my trailer-placer is sufficiently versatile in use that, when the ends of the grave are obstructed by stones or other objects, it may straddle the long sides, but the load will be applied far enough from the grave edges to avoid the above-mentioned danger.

A specific object of the invention is the provision of a burial vault trailer-placer which, when in the vault-lowering position, applies part of the load through the wheels at two adjacent corners of the grave and the remainder of the load through supports which are footed on the opposite side of the grave, preferably at the opposite two corners.

Another object of the present invention lies in the provision of an improved trailer-placer which can be readily loaded, positioned adjacent a grave, and unloaded by a single man. In this connection, another object lies in the provision of a trailer-placer having caster means in addition to the main weight-carrying wheels, said caster means being movable to and from a position to help support the weight of the trailer while the latter is being rolled into position over the grave.

As the description proceeds, it will be apparent that the improved trailer-placer may be used to advantage in placing, or removing, not only burial vaults, but many other types of heavy objects such as septic tanks, trees, and culverts to, and from, excavations.

Other objects and advantages will be apparent from the following description taken in connection with the drawings, in which:

Figure 1 is a vertical, sectional side view of one embodiment of the present invention showing in solid lines the trailer-placer as it would be used to transport a burial vault to a grave, and showing in broken lines, how it would be extended to cover a grave preliminary to lowering the burial vault therein;

Fig. 2 is a top plan view of Fig. 1;

Fig. 3 is a vertical, sectional end view of Fig. 1, taken along the lines 3—3;

Fig. 4 is an enlarged, fragmentary, sectional view of Fig. 1, taken along the lines 4—4; and Fig. 5 is an enlarged, fragmentary view of Fig. 1 showing details of a removable tail gate which comprises part of the invention.

Referring now more particularly to the embodiment illustrated in the drawings, it comprises a horizontal base or bed 21 carried by a pair of main supporting wheels 22. Caster means 23, comprising, in this case, a pair of auxiliary swivelable caster wheels 24, is provided for supporting the front end portion of the trailer-placer at times, and the caster means is movable between "up" and "down" positions.

During transport, of an object such as a burial vault 26 to a cemetery, the caster means will be in "up" or ineffective position; and during movement of the trailer-placer to the specific grave location in the cemetery, the caster wheels will be "down" so as to carry their share of the load. Lifting and lowering means, in this case a hoist generally designated 27, is mounted for longitudinal movement along supporting means 28, the latter having a portion 29 which is movable or extensible rearwardly to span at least part of the grave to apply part of the load of the vault to the earth rearwardly of the grave, or sideways depending on the approach, thereby permitting movement of the vault by the hoist from the bed 21 into the grave, and at the same time, distributing the weight of the vault over the strongest earth areas surrounding the excavation.

The bed 21 in this case comprises a pair of horizontal channel members 31 and 32 having their front end portions 31a and 32a inturned at approximately 45° (Fig. 2) and suitably joined as by means of a triangular plate 34 which may be welded or riveted in place. The forward end of the tongue 33 is provided with a coupling 36 for connection with a suitable towing vehicle such as a truck or tractor. The forward limit of the object-supporting portion of the bed is defined by a transverse channel cross-piece 37 suitably joined to the longitudinal members 31 and 32, as by welding. Diagonal cross-pieces 38 and 39 (see Fig. 2) are affixed as by welding across the bottom of the bed to impart rigidness to the structure.

The main wheels 22 are suitably rotatably mounted on the ends of axle means 41 which, in this case, extends completely across the underside of the bed. It will be obvious, as this description proceeds, that, if desired, stub axles may be employed to provide additional room for lowering the vault through the bed 21. At each end, in the case illustrated, the axle means is fastened by clamp means 42 to a longitudinal leaf spring assembly 43 which, in turn, has its ends fastened by shackle means 44 to the underside of one of the bed frame members 31 and 32. Positioned directly above the axis of the main wheels is a transverse angle member 44, joined, as by welding, to the bottom sections of the channel members 31—32.

The bed 21 is provided with a floor 46, in this instance made up of a plurality of transversely extending boards 47 whose ends are fitted in the hollow sections of the channel members 31—32 and suitably fastened therein as by rivets (not shown). The front end of the floor is defined by the cross-piece 37 and the rear end is defined by the cross-piece 44.

At the rear end of the bed is a removable tail gate 48 (see Fig. 5) which, when in place during transport, may serve as a rear support for the vault. The tail gate comprises, in this case, an angle iron 49, the horizontal section of which is provided with a pair of holes 51 registerable with corresponding holes 52 in the channel members 31—32 to permit a lock pin 53 to be dropped through at each end of the tail gate to hold the latter in place. Each lock pin is provided with a formed wire spring insert retainer 54 to maintain it against inadvertent loss. Atop the horizontal section of the tail gate, mounted as by rivets 56, is a board 57 of suitable thickness that its top surface is substantially at the same level as the top of the floor boards 47. The board 57 is likewise provided with a pair of openings 58 registering with the holes 51 in the angle iron to permit insertion of the lock pins 53.

It will be observed that the front-to-rear length of the floor 46 is somewhat more than half the length of the bed 21 as measured between the cross-piece 37 and the tail gate 48. This is an important part of the invention in stabilizing the load during transport, for, even where a maximum length object is carried which extends all the way from the front to the rear of the bed, its center of gravity will nevertheless be forward of the axle means (which in this case is directly below the rear end of the floor 46) so there will be no tendency for the vault to tilt backwards through the open part 59 of the bed, even when the tail gate is off, and so that, furthermore, the forward part of the trailer-placer will be urged in a downward direction to load the hitch 36 during towing to the cemetery and to load the caster means 23 during final movement in the cemetery.

It will be observed, also, that by the construction disclosed the space between the longitudinal channel members 31—32 may be opened completely behind the axle by removing the tail gate 48 together with any loose boards that may be temporarily stored within the open portion 59. Thus, to unload the vault it is necessary only to move it backward (by means to be described) sufficiently for the front of the vault to clear the rear of the floor, whence it may be lowered directly into the excavation.

Due to the congested condition of many cemeteries, it is not always possible to tow the trailer-placer by truck all the way up to the grave excavation. This latter operation must often be done manually. Furthermore, as above mentioned, the earth in the cemetery is sometimes soft and weak, particularly in the spring and fall, and will not not permit movement of a truck over the turf. Accordingly, to facilitate manual disposition of the trailer-placer to the grave and to distribute its total load as evenly as possible during such disposition, the previously mentioned two swivel-type caster wheels 24 are provided. The casters are fastened to the ends of shaft 61. The latter is rotatably journalled, transverse of the bed 21, in bushing members 62 which are mounted, as by welding, to the underside of the longitudinal channel members 31—32 (see Fig. 3). Collars 63 are held on said shaft by screws 64 outside of the bushing 62 to prevent endwise displacement of the shaft. As best shown in Figs. 1 and 3, a stop finger 66 is carried by the shaft 61 and is effective to stop the casters in either "up" or "down" position. Figs. 1 and 3 show in solid lines the casters in "down" position with one side of the stop bearing upwardly against one end of the diagonal cross-piece 38. Fig. 1 shows in broken lines the casters in "up" position with the opposite side of the stop bearing against the underside of channel member 32 and being maintained stably in that position by gravity on account of the over-center disposition of the casters. Suitably locking means (not shown) may be provided, if desired, to hold the casters in either of the positions shown, but normally will not be needed.

All four wheels are preferably rubber tired both to facilitate high-speed highway transport and to distribute as greatly as possible the weight load applied to the ground through the wheels.

The supporting means, generally designated 28, for the hoist, comprises, in this instance, a pair of longitudinally extending tubes 67 mounted side by side above the two bed channel members 31—32. Each of the tubes 67 is supported by the bed through a plurality of upstanding tubular struts 68 which are welded in place. At the front end the tubes 67 are connected by a tubular cross-piece 69, also welded in place. Gussets 71 fastened by welding are employed at a number of corners to stiffen the structure. The supporting means 28 is extendable by reason of the longitudinally movable section 29 which, in this case, comprises a pair of tubes 72 which are telescopically assembled within the relatively larger tubes 67. Obviously, if desired, the means 28 may comprise a mono-rail.

As shown in Fig. 4 each of the tubular members 72 is strengthened internally for heavy loads by means of an inner, square cross-section tube 73 which is assembled by means of a press or drive fit and, if desired, may be tack-welded at their common end to insure against slippage.

At their ends, the tubular members 72 are joined by a tubular cross-piece 74, also preferably welded in place. Gussets 76 impart rigidity. At the rear end of each tubular member 72 is telescopical leg means generally designated 77 which may be extended to bear against the earth at the corners of the grave opposite the trailer, as shown in Figs. 1 and 2. Each leg means comprises a tube 78 welded at the rear end of the member 72 and a relatively larger, telescopically assembled tube 79. A short stub or bushing 81 (Fig. 5) is provided on the bed frame, surrounding each pin 53, for engagement with the larger tube 79 during transport. A pin 82 similar to that designated 53 is assembled through the leg tubes to hold them in place as shown in Fig. 1. A plurality of holes 83 is formed in the lower end portion of the tube 78 to provide a selection of extended lengths of the leg members to compensate for varying levels of terrain at the rear end of the excavation. A small footing board 84 will preferably be employed under each extended leg to distribute the load applied therethrough. These footing boards may, if desired, be two boards which are temporarily stored in the bed open section 59 during transport.

The hoist generally designated 27 comprises a frame having a pair of transverse members 86 and longitudinal members 87 welded in the form of a rectangle (Fig. 2) spanning the width of the support tubes 67. A pair of spaced parallel shafts 88 and 89 are rotatably journalled in the frame members 87. Rollers 91 are mounted on shaft 88 as by means of screws 92 and are spaced to run along the tops of tubes 67 and 72 as tracks for moving the hoist between forward and rearward portions of the trailer-placer. Similar rollers 93 are rotatably journalled on shaft 89 for movement along the tracks 67—72. Internally of the hoist frame is a cable drum 94 rotatable by worm and pinion means 96—97 responsive to rotation of the shaft 89 by either of cranks 98 or 99 which are carried at the ends of that shaft.

To facilitate movement of the hoist along the top of the tubes 67—72, each of the tubes 67 is bevelled as shown at 101.

A windlass generally designated 102, mounted on the front bed plate 34, has been found to be very useful in connection with my device, both in loading and unloading vaults, and in snaking the trailer-placer uphill in a congested location where manual effort is insufficient and other power means cannot be applied. The windlass cable 103 is shown in solid lines as it would be used to draw the loaded hoist 27 forward in moving an object onto the floor 46 where the object being loaded is quite heavy. The use of the windlass is desirable to move the hoist up over the bevels 101 at the end of the supporting tubes 67. When the windlass is employed to move the trailer forward in a congested location, the cable 103 will extend forwardly and be affixed to some solid object such as a tree.

It is believed that in view of the foregoing description, the use of the trailer-placer will be apparent. However, one example of the way it may be utilized, in moving a concrete burial vault from the manufacturer to a grave will now be described.

Objects, such as concrete burial vaults, occupy a unique position in industry because their bulk, their great weight, and their low profit margin which dictate that for all practical purposes they must be manufactured within truck or trailer delivery distance of their final destination.

Accordingly, in using my present device, the trailer-placer is backed up to a vault which is to be loaded, and the rear tubular members are extended out over the vault and the tube legs 79 are extended downwardly to foot against the floor beyond the far end of the vault. Thus, preliminary to loading, the trailer is positioned with the two main wheels at one end of the vault and the leg members 79 at the other end. The tail gate 48 will be removed during the loading process. Also, any boards that may be temporarily stored in the open section 59 will be removed. Then the hoist 27 will be moved backward into a position of vertical alignment with the vault and be connected for lifting by means of suitable cables or ropes in circling the vault. The vault will then be lifted straight up through the open space 59 until the bottom is above the level of the floor 46 following which the hoist 27 will be moved forwardly, using the windlass 102, if necessary, and the vault will then be lowered into place on the floor 47. The leg members will be retracted and the telescopic section 29 will be moved forward into the section 28 following which the parts will be secured by pins 53 and 82 in the manner shown in Fig. 1. The front end of the trailer will be jacked up (by means not shown) sufficiently to swing the casters 24 upwardly into their dotted line position of Fig. 1 and the casters and the hoist will be suitably secured in place for transport following which the loaded trailer-placer will be towed to the cemetery where the grave awaits it.

At the cemetery the trailer-placer will be taken as close to the grave as possible by means of the tow truck, following which it will be disconnected and the casters moved down into their Fig. 1 solid line position. The device will then be moved manually, or, if necessary, by means of the windlass 102 to a position in alignment with the longitudinal axis of the grave, as shown in Figs. 1 and 2, with the main wheels 22 bearing on the corner earth areas at one end of the excavation. The section 29 and the legs 79 will be extended to the broken line position of Figs. 1 and 2 with the ends of the supporting tubes 72 bearing through legs 79 and footing pieces 84 on the grave corner areas remote from the wheels. Any boards in the open section 59 will be removed, and as mentioned above, the tail gate 48 will be removed so that the bed 21 is open all the way behind the axle means 41. The vault will then be lifted from its position designated A by means of the hoist, and then by moving the hoist backward along its tracks the vault will be moved to a position B in vertical alignment with the excavation. The vault will then be lowered through position C into the grave.

If congestion in the cemetery prevents a lengthwise approach to the grave, it may be approached sidewise, to a position where the wheels 24 and footing boards 84 bear at a safe distance beyond their respective edges. In this case, the vault must be turned at right angles to the trailer before it is lowered into the excavation.

While a particular form of the present invention has been shown, it will be apparent that minor changes therein will readily suggest themselves to others skilled in the art without departing from the spirit and scope of the invention.

I claim:

1. A trailer for burial vault handling comprising: a bed supported by transverse axle means carrying wheels at opposed ends thereof; said bed having a length substantially equivalent to the vault it is adapted to carry and having a vault-supporting floored section ahead of and terminating rearwardly at said axle means, and having a non-floored section behind said axle means; the length of said floored section being greater than that of said unfloored section to stabilize the trailer and the vault by placing the center of gravity of the vault ahead of said axle means; said bed having means for hitching to a towing vehicle; and hoist means supported on the bed for hoisting the vault from the floored section, moving it backward to clear the rear thereof, and lowering it through said unfloored section into a grave while applying part of the weight load of the vault to earth areas on the remote side of the grave.

2. A trailer for burial vault handling comprising: a bed supported by transverse axle means carrying wheels at opposed ends thereof; said bed having a length substantially equivalent to the vault it is adapted to carry and having a vault-supporting floored section ahead of and terminating rearwardly along said axle means, and having a non-floored section behind said axle means; said non-floored section having at its rear a removable tailgate member with a top surface co-planar with that of said floored section to function as a supplemental terminal support for said vault; the length of said floored section being greater than that of said unfloored section to stabilize the trailer and vault by disposing the center of gravity of the latter ahead of said axle means; said bed having means for supporting the front end of the bed on a towing vehicle; and vault lifting and lowering means carried by said bed including a hoist mounted on rail means and means for extending said rail means beyond the rear of the trailer, over a grave and supporting it on the earth areas beyond the grave whereby the vault may be lifted from the floored section, moved backward to clear the rear of the floored section and lowered into the grave through the non-floored section and the space normally occupied by the tailgate when in place while applying part of the weight load of the vault to said earth areas beyond the grave.

3. A trailer for transporting an object such as a burial vault and lowering it into an excavation, comprising: a base portion including a pair of spaced horizontal members extending from front to rear across the axis of a pair of supporting wheels and having means for connecting it to a prime mover such as a truck; said base portion having a floor forward of said axis for supporting said object and having a tail gate normally connecting the rear ends of said members to retain said object against backward displacement during transport but being removable to facilitate lowering said object through the base portion during unloading; said base portion having a plurality of upstanding supporting members carrying a pair of horizontal tubes spaced from one another and spaced from said horizontal members and extending transverse to the axis of said wheels; each of said tubes having tubular means telescopically engaged therewith for movement between a contracted or forward position and an extended or rearward position; said tubular means having at least one extension adapted to bear against the earth adjacent the edge of the excavation remote from the wheels, when the latter are adjacent the excavation; and lifting and lowering means movable along said tubes and tubular means to lift said object, move it transversely of said wheel axis, and lower it through the base portion into the excavation when the tail gate is removed.

4. A trailer for loading and transporting a burial vault and lowering it into an excavation comprising: a base having a length at least equivalent to that of the vault it is adapted to carry mounted across the axis of a pair of main wheels; said base having vault-supporting and non-supporting sections ahead and behind said axis, respectively, the former having the greater length to position the center of weight of the vault ahead of the wheels; caster means forward of said main wheels and movable to and from a position to engage the ground to facilitate manual movement of the trailer; lifting and lowering means for said vault; and means carried by said base for supporting said lifting and lowering means above said base and for permitting moving the lifting and lowering means longitudinally of said base; said supporting means having an extensible portion adaptable to span the excavation, when the trailer is positioned with the main wheels adjacent the excavation, to bear on the ground opposite said main wheels to thereby distribute the load of the vault about the excavation during the lowering operation.

5. A trailer for burial vault handling comprising: a pair of axially aligned wheels; a base including a pair of spaced horizontal members extending from front to rear across the axis of said wheels; said horizontal members defining the sides, respectively, of floored and unfloored sections of said base, said sections adjoining along said axis; the total length of said sections being at least equivalent to that of the vault it is adapted to carry, said floored section having a greater length than said unfloored section to stabilize the vault and trailer by placing the center of gravity of the vault ahead of said axis during transport; hoist-supporting rail means carried by and above said base and being extendible rearwardly thereof; said rail means having a pair of footing members normally supported by the rear end portions respectively of said horizontal members for transport in retracted condition, and adapted to be supported on earth areas remote from the wheels when said rail means is extended rearwardly.

6. A trailer for use in handling an object such as a burial vault and lowering it into an excavation comprising: a base mounted across the axis of a pair of wheels; said base including an object-supporting portion ahead of said axis and an adjacent open-bottomed non-supporting portion behind said axis, said portions adjoining substantially along said axis whereby the object-supporting portion is wholly ahead of said axis and said non-supporting portion is wholly behind it, said object-supporting portion having a greater dimension measured transverse of said axis than said open-bottomed portion to thereby facilitate maintaining, during transportation, the center of gravity of said object ahead of said axis; means carried by said base for lifting said object from said supporting portion, moving it backward into vertical alignment with said non-supporting portion, and lowering it therethrough into said excavation; and additional means carried by said base and extendible rearwardly thereof for distributing the weight of said object over ground areas forward and rearward of said excavation during such lifting-moving-lowering of the object.

7. A trailer-placer for loading and transporting an object such as a burial vault and lowering it into an excavation comprising: a base mounted across the axis of a pair of wheels; said base including an object-supporting portion ahead of said axis and an open-bottomed non-supporting portion having lesser length than said supporting portion behind said axis; hoist means carried by said base for lifting and lowering said object from and to said supporting portion; said base having track means along which said hoist means is movable to move said object between said base supporting portion and said non-supporting portion; means for extending said track means over said non-supporting portion to span at least a part of said excavation when the wheels are adjacent the latter; and means for supporting the end of said track means upon the earth areas beyond said excavation when the track means is extended as aforesaid to thereby distribute the weight of the object forward and rearward of said excavation when the object is being lowered through said base non-supporting portion into the excavation.

CARL HARRIS.

REFERENCES CITED

The following references are of record in the file of this patent:

UNITED STATES PATENTS

| Number | Name | Date |
|---|---|---|
| 701,906 | Lutz | June 10, 1902 |
| 1,764,935 | Davey et al. | June 17, 1930 |
| 2,028,442 | Dormer | Jan. 21, 1936 |
| 2,333,208 | Spear | Nov. 2, 1943 |
| 2,444,690 | Almendinger et al. | July 6, 1948 |
| 2,499,442 | Wright | Mar. 7, 1950 |

FOREIGN PATENTS

| Number | Country | Date |
|---|---|---|
| 31,258 | Germany | May 1, 1885 |
| 470,114 | Great Britain | Aug. 10, 1937 |